W. L. JONES.
CONVEYING APPARATUS.
APPLICATION FILED JULY 10, 1920.
1,425,861.
Patented Aug. 15, 1922.
4 SHEETS—SHEET 1.
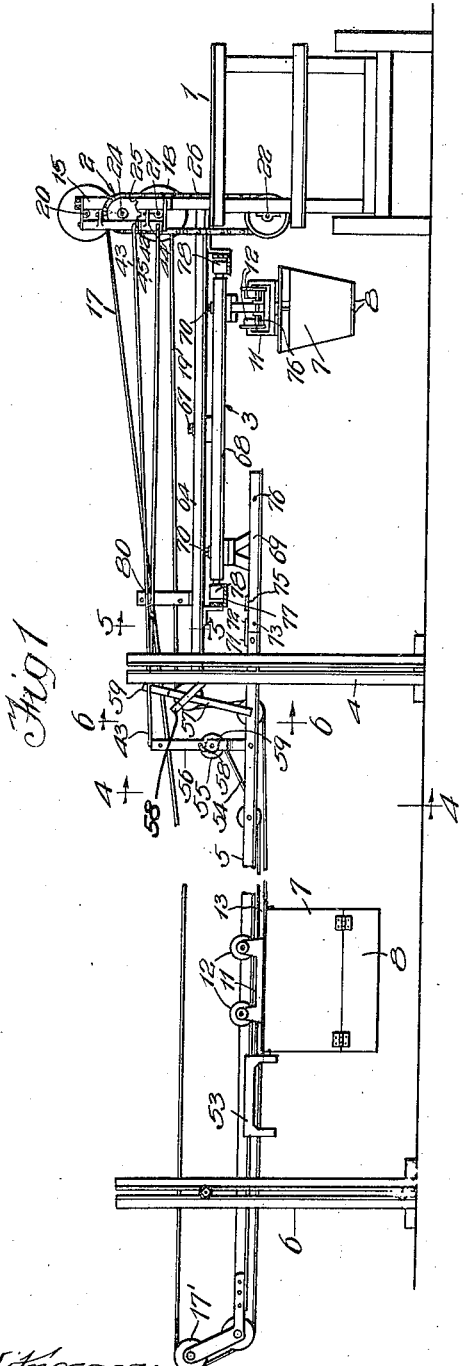
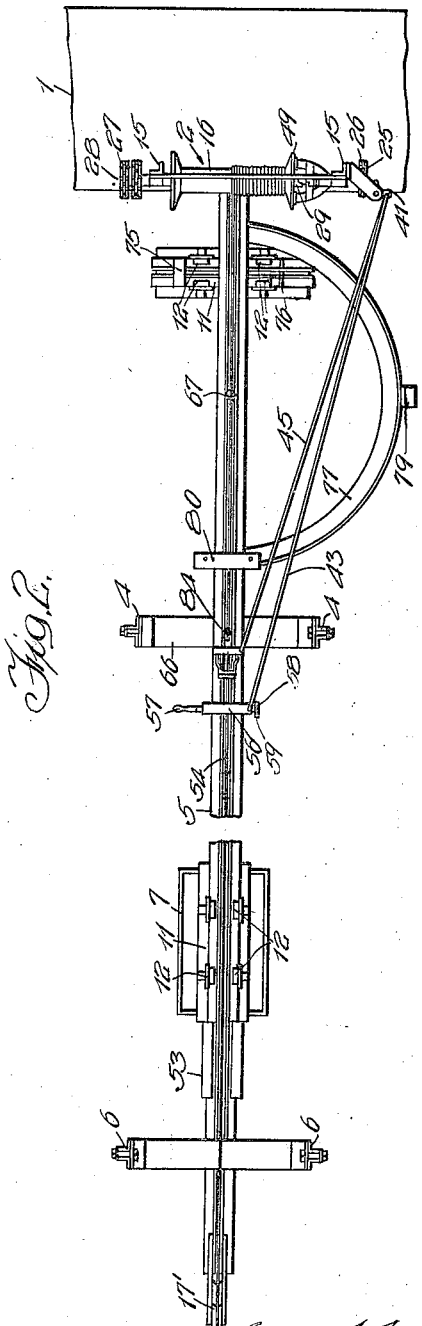

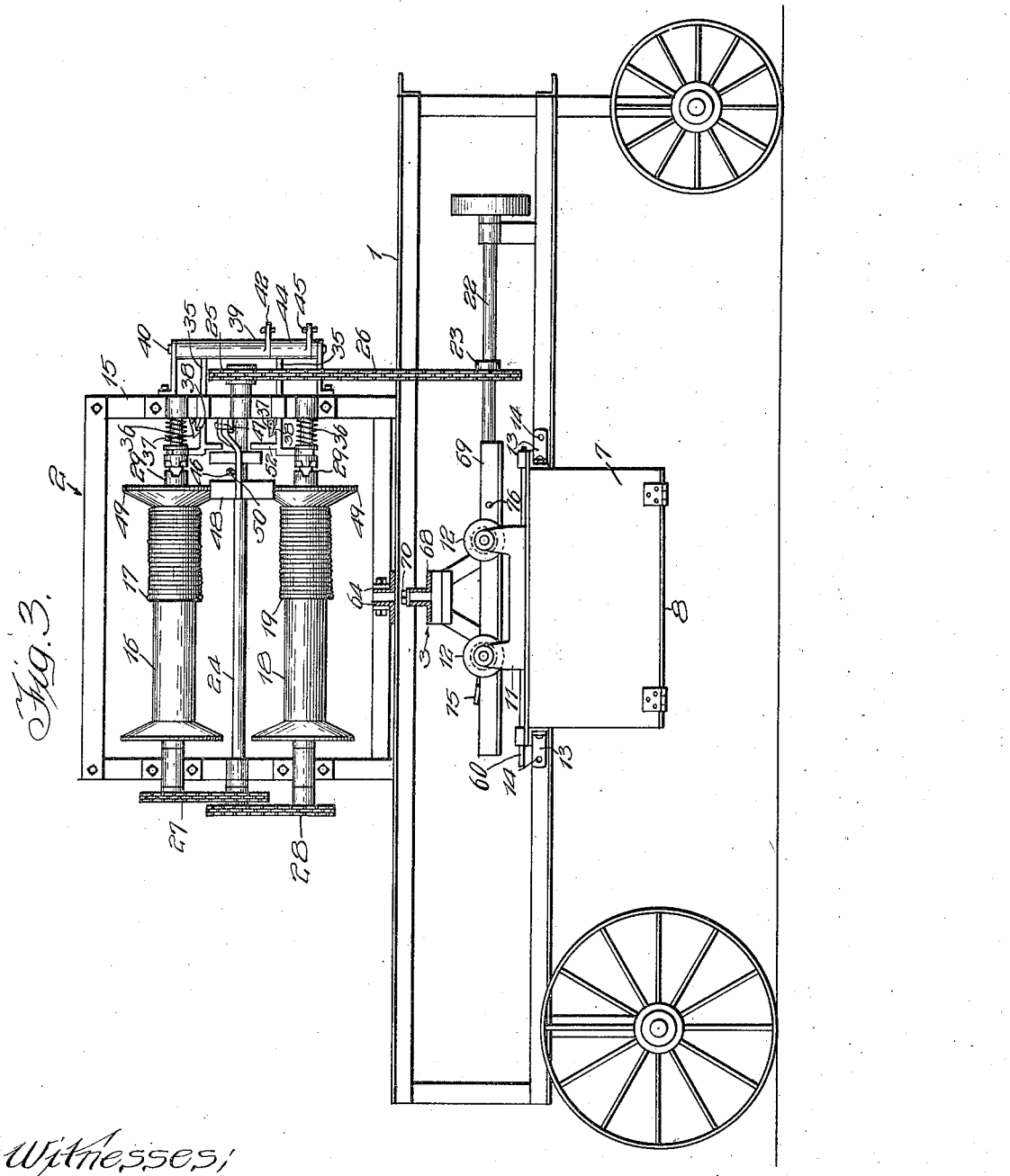

W. L. JONES.
CONVEYING APPARATUS.
APPLICATION FILED JULY 10, 1920.
1,425,861.
Patented Aug. 15, 1922.
4 SHEETS—SHEET 3.
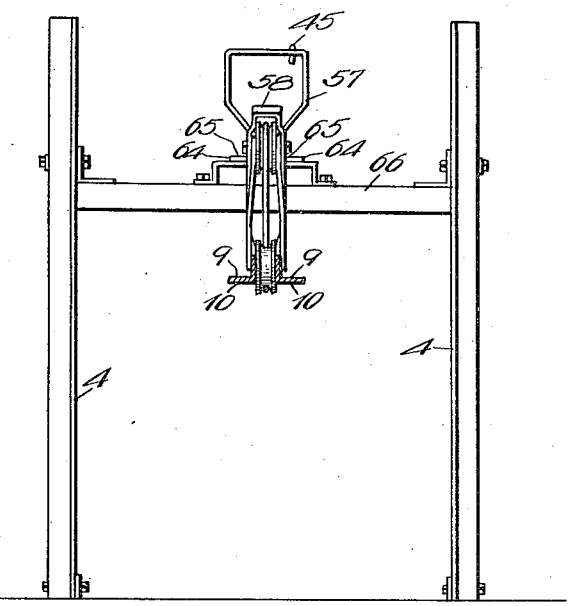
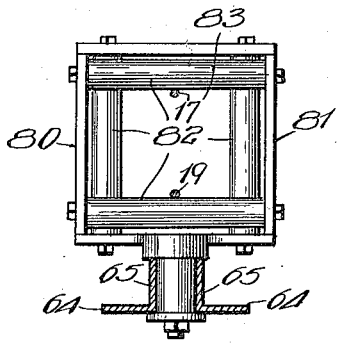
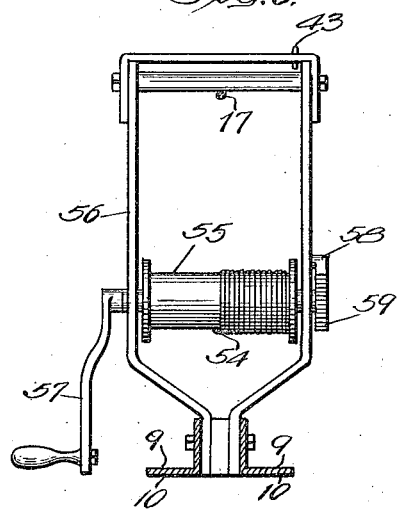
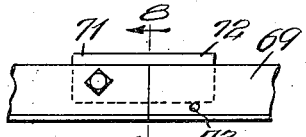
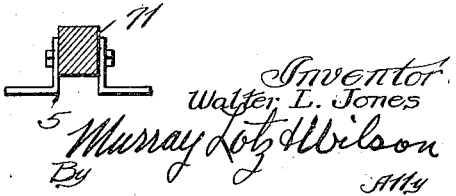
Witnesses:
W. F. Kilroy
Harry R. LeWhite
Inventor
Walter L. Jones
By Murray Lotz & Wilson
Atty W. L. JONES.
CONVEYING APPARATUS.
APPLICATION FILED JULY 10, 1920.
1,425,861.
Patented Aug. 15, 1922.
4 SHEETS—SHEET 4.
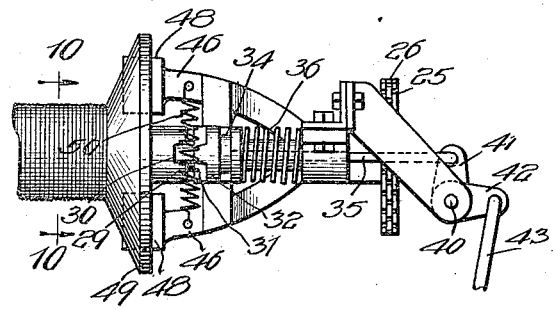
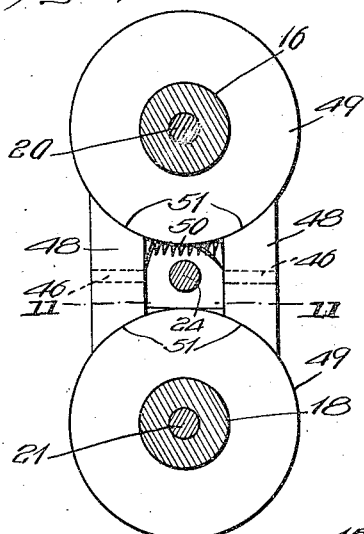
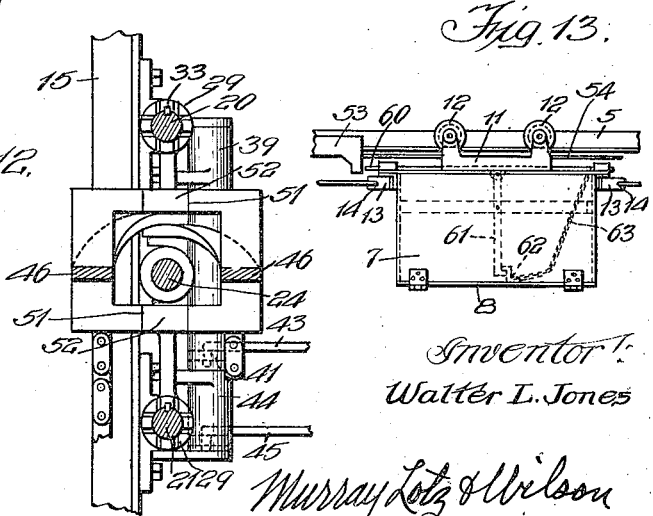
Witnesses.
W. F. Kilroy
Harry R. L. White
Inventor:
Walter L. Jones
By Murray, Lotz & Wilson
Attys.

UNITED STATES PATENT OFFICE.

WALTER L. JONES, OF EARLVILLE, ILLINOIS.

CONVEYING APPARATUS.

1,425,861.  Specification of Letters Patent.  Patented Aug. 15, 1922.

Application filed July 10, 1920. Serial No. 395,193.

*To all whom it may concern:*

Be it known that I, WALTER L. JONES, a citizen of the United States, and a resident of Earlville, in the county of La Salle and State of Illinois, have invented certain new and useful Improvements in Conveying Apparatus, of which the following is a specification.

My invention relates to improvements in conveying or distributing apparatus, particularly adapted for conveying concrete to a place of deposit for use.

The object of my invention is to provide conveying apparatus which shall be so coordinated, arranged, operated and controlled that buckets may be successively filled with concrete, conveyed to a place of deposit, and returned to the place of filling under the control of an operator who remains in one position.

Other important features of my invention relate to means of simple character for causing the buckets to be dumped at different points in its travel, and means for directing the travel of the buckets at different angles to the loading position. Another feature relates to automatic means for controlling the cables by which the bucket is stopped. Other features and objects of importance will be made clear hereinafter.

My invention will be more readily understood by reference to the accompanying drawings forming part of the specification, and in which:—

Figure 1 is a fragmentary side elevation of a filling and conveying system constructed and operable in accordance with my invention;

Figure 2 is a top plan view of same;
Figure 3 is a side elevation of the cable drums and control mechanism;

Figures 4, 5 and 6 are vertical sectional views on the lines 4—4, 5—5 and 6—6 respectively of Figure 1;
Figure 7 is a fragmentary side elevation showing the lock between the fixed and movable parts of the track;

Figure 8 is a vertical section on the line 8—8 of Figure 7;
Figure 9 is a fragmentary plan view of the drum control;

Figure 10 is a vertical section on the line 10—10 of Figure 9;

Figure 11 is a fragmentary horizontal section on the line 11—11 of Figure 10;

Figure 12 is a fragmentary vertical section on the line 12—12 of Figure 11; and

Figure 13 is a fragmentary view showing a side elevation of the traveling bucket.

In said drawings, 1 represents a portable machine frame upon which may be carried any suitable concrete mixer and source of power such as gas engine. As the mixer and engine do not form part of this invention they are not illustrated.

Upon the machine frame 1 a cable operating and control mechanism 2 for moving and controlling the bucket is mounted. Attached to and extending out from one side of its frame is a turn table 3 which is supported at its opposite side by a suitable standard 4. Extending out from the standard 4 is a horizontal run way or track 5 supported at intervals by suitable standards or legs 6.

Buckets 7 are provided, adapted to hang from the track and turn table and to transport materials such as concrete from the filling position to a desired point along the track for dumping. The track 5 may be made up of any suitable length, the standards 6 being spaced apart to properly carry the load and the track being made up of suitable sections connected end to end, as is usual in such devices. Means are provided by which the bucket can be dumped at any point along the track, preferably beginning at the point farthest from the filling position and successively dumping at nearer points until the concrete has been dumped in a substantially continuous line from the outer end of the track up to the turn table. This method is particularly useful in the building or laying of cement side-walks, roadways, etc.

The buckets are identical, and while one is transporting the material the other can be filled.

These buckets are preferably rectangular in shape, open at the top for filling and having hinged closures 8 at the bottom for dumping. The automatic unlocking of these closures will be made clear hereinafter.

The track 5 upon which the bucket hangs is preferably made of two metal angles 9 arranged back to back and spaced apart and each having one flange 10 projecting out to support the wheels from which the buckets hang. Each bucket is provided with a bifurcated supporting frame 11 at its top, which straddles the track 5 from beneath and each side thereof carries flanged rollers or wheels 12 adapted to rest upon and roll along the flanges 10 of the track 5. At each end of the bucket is arranged a projection 13 having a hole 14 for convenience in connecting the operating cables to the buckets.

As the buckets are moved by cables I provide one cable to pull the bucket out to its dumping position and another cable for pulling it back again. While it might be possible to operate the buckets with a single continuous cable and single pulley or drum, I prefer two cables and two drums as illustrated.

The cable operating and controlling mechanisms comprise an auxiliary frame 15 mounted on the main frame 1 and in which I mount an upper cable drum 16 upon which a cable 17 is wound, which is adapted to pull the bucket out of its dumping position and a lower cable drum 18 upon which a cable 19 is wound which is adapted to pull the bucket back from its dumping position.

These drums are mounted on shafts 20, 21 respectively for rotation and are adapted to be rotated by means of a suitably driven shaft 22 mounted on the frame 1 through the medium of suitable chain gearing. The shaft 22 carries a sprocket wheel 23 and I provide a counter shaft 24 mounted in suitable bearings on the frame 15 and preferably arranged horizontally midway between the two drums. One end of the shaft carries a sprocket 25 which is geared to the sprocket 23 by a chain 26. The opposite end of the shaft 24 is operatively connected by chains 27, 28 for rotating the shafts 20, 21 in unison.

For the purpose of driving either one or the other of said drums 16 or 18 in order to pull the bucket out or in as desired I provide a jaw clutch 29 for each drum having tapered notches 30 in one member and similarly shaped projections 31 on the other member thereof. The member 32 which carries the projection 31 is movable longitudinally on the shaft of the drum from and toward the drum to disengage and engage the clutch. The member 32 is longitudinally movable on the shaft and is rotatably engaged therewith by a key or spline 33. The hub of each clutch member 32 is provided with a circumferential groove 34 and I provide a longitudinally movable operating rod 35 which is adapted to pull the clutch open to stop the rotation of the drum against the force of a compression spring 36, which tends to close the clutch.

As the two drums which tend to move the bucket in opposite directions, I provide means for holding the clutches open so that only the clutch which is manually released will be engaged. This means comprises gravity hooks 37 adapted to engage projections 38 on the rods 35 as they are drawn back, said hooks being adapted to be lifted by hand when it is desired to cause one or the other of the drums to rotate.

For pulling the rod 35 out to disengage the clutch I provide a swinging lever 39 mounted on a vertical shaft 40. This lever has an arm 41 pivotally connected to the outer end of the rod 35 of the upper drum clutch. This lever also has a fixed arm 42 to which a cable 43 is attached which leads out to a mechanism adapted to be operated by the bucket as it reaches the outer limit of its travel and move the lever 39 to disengage the clutch of the upper drum. For controlling the clutch of the lower drum I provide a similar bell crank lever 44 also mounted on said vertical shaft 40, which has an arm connected to the operating rod 35 of the lever clutch and a second arm connected by a cable 45 with mechanism adapted to be engaged and operated by the bucket as it reaches the inner limit of its movement; that is the inner limit of the track 5 and disengage the clutch of the lower drum.

In order to be able to operate the bucket quickly I connect both cables to it and consequently the cable will be running off of the idle drum as it is being wound on to the pulling drum and when the pulling drum is stopped at the end of the travel of the bucket the idle drum, unless controlled, would be apt to deliver more cable than necessary, thus fouling the lines. To prevent this action I hold both drums against rotation except when one is being rotated and at such time I free both drums so that the cables can be properly operated. For this purpose I provide a pair of brake levers 46 pivotally mounted at one end on a pivot pin 47 on the frame 15 and adapted to swing out and in in a horizontal plane. Each lever has a friction block 48 at its free end adapted to enter between the edges of the flanges 49 on the drums 16 and 17. The levers are normally drawn against the flanges 49 by a compression spring 50 which connects the two levers together. To force the levers apart so that the drums can rotate freely I provide wedging surfaces 51 on the inner sides of the levers and I provide a projection 52 on each operating rod 35 projecting toward each other and adapted to extend between the wedging surfaces and force the levers outwardly when the rods move inwardly to close the clutches. This construction releases both drums no matter which drum is clutched, and immediately on the opening of the clutch the brake is applied to both drums and both are substantially instantly stopped.

For operating the lever 39 for stopping the drum at the end of the outward travel of the bucket, I provide a relatively heavy weight or block 53 mounted to slide along the track 5. This weight is adapted to be drawn out by hand to the outer end of the track 5 and is adapted to limit the outward travel of the bucket and to dump the bucket. A cable 54 is attached to the inner end of the block between the angles 9 and leads to a small drum 55 mounted for rotation in a swinging lever 56 pivotally mounted at its lower end on the track 5, near the inner end of the track. This drum is adapted to be rotated by a crank 57 to wind in the cable 54 and is held against the pull of the cable by a gravity dog 58 and a ratchet wheel 59. The upper free end of the lever 56 is connected by the cable 43 with the control lever 49. The adjustment of the several parts is such that when the upper latch 38 is lifted and the upper rod 45 is pushed in to clutch the upper drum, the upper end of the lever 56 is drawn toward the right (Figure 1) and when the bucket strikes the sliding stop 53 the lever is pulled out to the left by the cable 54, thus pulling upon the cable 43 and unclutching the upper drum.

The drum 55 is for the purpose of drawing the weight in towards the inner end of the track to cause the bucket to dump successively near the machine.

For stopping the lower drum when the bucket reaches the inner end of the track 5 I provide a swinging lever 57 pivotally mounted between its ends at the inner end of the track 5 on a bracket 58. The upper end 59 of this lever is connected to the cable 45, which is connected to the lever 44 for controlling the lower drum.

The adjustment is such that the upper end of the lever is swung to the right (Figure 1) when the lower drum is clutched and the lower end to the left. The incoming bucket strikes the lower end of the lever, moving it to the right and pulling on the cable 45 to stop the lower drum when the bucket reaches the inner end of the track. To permit the bucket to pass the lever to enter upon the turn table, the cables are unhooked from the ends of the bucket, the bucket is rolled back along the track a little way to permit the lower end of the lever 57 to swing up above the top of the bucket and then the bucket is moved freely beneath the lever on to the turn table.

For causing the bucket to dump when it strikes the block 51 I provide a sliding bar 60 in the upper part of the bucket. This bar is pivotally connected to a latch lever 61 mounted within the bucket. The lower end of the latch lever is adapted to hook beneath hook members 62 secured to the upper side of the closures 8 so that when said closures are lifted they can be held by the latch. Chains 63 can be attached to the closures 8 and extend up through the bucket by which the closures can be conveniently lifted.

As far as the operating mechanism is concerned the inner end of the track might be the filling position or this track might extend up to the frame 1, in which case obviously only one bucket could be used which would alternately travel out and in.

For convenience in manipulating the buckets for filling I provide what I term the turn table device 3. This consists of a bridge member made up like the tracks 5 of two metal angles 65. This bridge is supported at one end on the frame 1 and at its outer end by a cross bar 66 on the standard 4.

Pivotally mounted at substantially the middle of this bridge on a vertical pivot 67 is a swinging member 68. This member is mounted at its middle point on the pivot 67 beneath the bridge and is adapted to swing around in a horizontal plane. Pivotally mounted beneath each end of the member 68 is a short section of track 69. Each of these sections is mounted to swing in a horizontal plane on a vertical pivot 70 secured in the member 68. Each section 69 is long enough to receive the wheels which support the bucket and they are adapted to be aligned with the track 5 for transferring a bucket from the tracks to the turn table, or vice versa.

For holding the section 68 aligned with the track 5 during the transfer of the bucket I provide a latch or lock bar 71 pivotally mounted between the angles which comprise the section and arranged so that its outer end 72 can be dropped between the inner ends of the angles 9 of the bracket 5 as best shown in Figures 7 and 8. The track 5 is provided with a stop pin 73 to support the lock bar 71 in locking position.

To hold the bucket on the section 69 for filling and during the transfer around the turn table I provide a fixed stop 76 at one end of the section against which the forward wheels 12 of the bucket support strike as the bucket is transferred to the section and I provide a latch member 75 pivotally mounted on the section 69 to swing up and down and having a cross bar 75 at its free end adapted to drop down beyond the rear wheels 12 and hold the bucket from rolling off the section. As the sections 69 are pivotally hung upon the ends of the member 68 the buckets can be swung around to bring their long sides toward the frame 1 for convenience in filling the bucket. After one bucket has been filled and the other has been emptied, the empty bucket can be transferred to one section 69 and then the turn table unlocked and swung around to bring the empty bucket to filling position and the full bucket to a position to be transferred to the track 5. To support the turn table member 64 when it is carrying a loaded bucket one one end, I provide a semi-circular track 77 upon which rollers 78 on the ends of the member 64 are carried. This track is supported at its ends on the bridge member 64 and by a middle post or leg 79.

The operating cables 17 and 19 pass through a cable guide 80 arranged near the outer end of the bridge member 64. This guide consists of a frame 81 in which four anti-friction rollers 82 are mounted, forming an opening 83 through which the cables can run without friction and be guided properly upon the drums 16 and 18.

The inner end of the track 5 is connected to the cross bar 66 and the standard 4 by a vertical bolt 84 and this forms a pivotal connection between the track and the bridge which permits the track to be swung around to extend out at an angle to the bridge. The limit of such movement of the track would be substantially to a position at right angles to the bridge, this angular adjustment is of great advantage in setting the machine for proper delivery of the concrete in some situations.

The operation of the machine is as follows: A bucket is filled with concrete at the filling position, the turn table being held stationary by the block 72. When the bucket is filled the turn table is unlocked and swung around, the section of track 68 on which the filled bucket hangs is aligned with and locked to the track 5. The bucket latch 75 is then lifted and the filled bucket is transferred to the track 5, rolling freely beneath the stop lever 57. The two cables 17 and 19 are then hooked to the ends of the bucket. During the filling of the one bucket the other bucket has been returned to the turn table so that as the filled bucket is swung around to be delivered, the empty bucket is swung to filling position. The cables being hooked to the filled bucket, the upper control latch 37 is lifted, permitting the upper drum to be clutched and spreading the brake levers to release both drums. The upper drum winds in the cable 17 and draws the bucket out to the stop block 53 this cable being carried to the outer end of the track and around a suitable guide sheave 17'. When the bucket strikes the block 53 the bucket is automatically dumped, as explained, and the clutch on the drum 15 is opened and the brake set by the pull of the cable 43 on the lever 39 and the upper latch locks the upper clutch rod 35 in its withdrawn position. The lower latch 37 is then lifted, which permits the lower drums 18 to be clutched and the cable 19 draws the empty bucket back. When the incoming bucket strikes the lever 57, as explained, the lower drum is unclutched and the brake set by the pull on the cable 45. Between the delivery of the successive buckets the block 53 can be drawn inwardly by means of the drum 55, as may be desired, to cause the buckets to dump successively nearer to the machine.

As it will be obvious that many other operating devices will readily suggest themselves to one skilled in the art, by which to accomplish the results desired, I do not limit or confine my invention to the specific details of construction herein shown and described, except within the scope of the appended claims. It should be understood that I have shown devices which are operable to accomplish the desired functions and that they are in a sense merely typical representations.

I claim:

1. In a conveying system, an elevated track, a bucket adapted to hang from and to travel on said track, operating means for moving the bucket in both directions on the track, a movable stop on the track for stopping the travel of the bucket in one direction, means extending from the vicinity of the operating means for adjusting the position of said stop, and a relatively fixed stop for limiting the movement of the bucket in the opposite direction.

2. In a conveying system of the character described, an elevated track, a bucket adapted to hang from and to move along said track, relatively fixed means for moving said bucket, cables connecting the bucket to said moving means, an adjustable stop on the track for limiting the movement of the bucket in one direction and for stopping said bucket moving means, and a relatively fixed stop at one end of said track for stopping the travel of the bucket in the other direction and for stopping the bucket moving means.

3. In a conveying system of the character described, an elevated track, a bucket adapted to hang from and to be moved along said track, relatively fixed means for moving said bucket, cables connecting the bucket to said moving means, an adjustable stop on the track for limiting the movement of the bucket in one direction and for dumping the bucket, means connecting said stop with said bucket moving means for stopping the movement thereof, and a relatively fixed stop at one end of said track for stopping the travel of the bucket in the other direction, and connection between said fixed stop and said bucket moving means for stopping the bucket moving means.

4. In a conveying system of the kind described, an elevated track, a bucket adapted to hang from and to be moved along the track from a filling position to a dumping position and back again, a movable stop on the track for determining the dumping position, means adjacent to the filling position for adjusting the position of the stop for dumping the bucket at various distances from the filling position, relatively fixed bucket moving means adjacent to the filling position, and means operable by the bucket adjusting means for controlling the operation of the bucket moving means.

5. In a conveying system of the kind described, an elevated track adapted to be arranged above a space upon which it is desired to place concrete, dumping buckets movable along the track from a filling position to a dumping position, bucket moving mechanism arranged adjacent to the filling position, cables adapted to connect the bucket to said moving means for moving the buckets along the track, a hanging turntable arranged at the filling end of the track to permit an empty bucket to be taken from the track and a full bucket to be transferred to the track, and means for locking the turn table to the track for the transfer of the buckets to and from the track.

6. In a conveying system of the kind described, an elevated track along which dumping buckets are movable from a filling position to a dumping position, a heavy stop block slidable on the track for adjusting the dumping position, means adjacent to the filling position for drawing the block toward the filling position to adjust the dumping position, relatively fixed bucket moving means adjacent to the filling position, means associated with said stop adjusting means for stopping the bucket moving means when the bucket strikes said stop.

7. In a conveying system of the kind described, an elevated track along which dumping buckets are movable from a filling position to a dumping position, means adjacent to the filling position operable for moving the bucket back and forth on the track, comprising a cable drum and cable for pulling the bucket out from the filling position, a second cable drum and cable for pulling the bucket back, means controlled by the bucket for stopping the drums at both limits of movement of the bucket.

8. In a conveying system of the kind described, an elevated track along which dumping buckets are movable from a filling position to a dumping position, a heavy stop block slidable on the track for adjusting the dumping position, means adjacent to the filling position for pulling the stop block toward the filling position to change the adjusting position, means adjacent to the filling position operable for moving the bucket back and forth on the track comprising a cable drum and cable for pulling the bucket out from the filling position, a second cable drum and cable for pulling the bucket back, rotatable shafts upon which the drums are mounted, spring actuated clutch means on the shafts for clutching the drums to the shaft for rotating same, latch means for normally holding the clutches open, and brake means associated with the clutches for holding the drums against rotation when both clutches are open.

9. In a conveying system of the kind described having a track along which dumping buckets are movable, a bucket movable along the track from a filling position to a dumping position, relatively fixed bucket moving means arranged adjacent to the filling position, and comprising a cable drum rotatably mounted on a shaft and a cable connecting the drum with the outer end of the bucket for pulling the bucket out from the filling position, a second drum rotatable on a second shaft and a second cable connecting the second drum with the inner end of the bucket for pulling the bucket back to the filling position, spring actuated clutch elements for clutching the drums alternately to their shafts, brake means normally holding the drums against rotation, clutch controlling elements for clutching the drums alternately to their shafts, and co-operating means for releasing both drums from the brake when either drum is clutched to its shaft.

10. In a system of the kind described, having means for filling buckets, a track along which buckets are adapted to be transported from a filling position to a dumping position, a turn table adjacent to the filling position, said turn table comprising a member pivotally hung at its middle portion and having track sections pivotally hung from its ends, said sections adapted to be locked in alignment with the tracks for the transfer of buckets, and a semi-circular track arranged at one side of the turn table for supporting said swinging member when being swung around with a loaded bucket.

11. In a conveying system of the kind described having means for filling buckets, a track along which buckets are adapted to be transported from the filling position to a dumping position, a turn table adjacent to the filling position, comprising a member pivotally hung at its middle portion and having track sections pivotally hung from its ends, said sections adapted to be alternately locked in alignment with the track for transfer of buckets, and locking means on said sections for retaining the buckets thereon when said sections are free of the said track.

Signed at Earlville, Illinois, this 6th day of July, 1920.

WALTER L. JONES.